US011656463B2

(12) United States Patent
Gruhlke

(10) Patent No.: US 11,656,463 B2
(45) Date of Patent: May 23, 2023

(54) EYE TRACKING USING A LIGHT DIRECTING MECHANISM

(71) Applicant: QUALCOMM Incorporated, San Diego, CA (US)

(72) Inventor: Russell Gruhlke, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 17/109,963

(22) Filed: Dec. 2, 2020

(65) Prior Publication Data

US 2022/0171188 A1  Jun. 2, 2022

(51) Int. Cl.
*G02B 27/01* (2006.01)
*G06F 3/01* (2006.01)

(52) U.S. Cl.
CPC ..... *G02B 27/0172* (2013.01); *G02B 27/0179* (2013.01); *G06F 3/013* (2013.01); *G02B 2027/0138* (2013.01); *G02B 2027/0187* (2013.01)

(58) Field of Classification Search
CPC ............ G02B 27/0172; G02B 27/0179; G02B 2027/0138; G02B 2027/0187; G06F 3/013
See application file for complete search history.

(56) References Cited

U.S. PATENT DOCUMENTS

| 10,598,928 | B1* | 3/2020 | Lam | G06F 3/013 |
| 10,845,594 | B1* | 11/2020 | Lam | G02B 27/0093 |
| 11,360,557 | B2* | 6/2022 | Berkner-Cieslicki | G02B 27/0172 |
| 2004/0108971 | A1* | 6/2004 | Waldern | G02B 27/017 345/8 |
| 2010/0060551 | A1* | 3/2010 | Sugiyama | G02B 26/06 353/31 |
| 2013/0016413 | A1* | 1/2013 | Saeedi | G02B 27/01 359/205.1 |
| 2014/0354952 | A1* | 12/2014 | Verly | A61B 5/18 351/221 |
| 2018/0157909 | A1* | 6/2018 | Ollila | G06V 40/193 |
| 2018/0157910 | A1* | 6/2018 | Ollila | G06T 7/73 |
| 2018/0275409 | A1* | 9/2018 | Gao | H04N 13/383 |
| 2021/0041948 | A1* | 2/2021 | Berkner-Cieslicki | G06F 3/011 |

OTHER PUBLICATIONS

Partial International Search Report—PCT/US2021/071772—ISA/EPO—dated Jan. 27, 2022.
Stengel M., et al., "An Affordable Solution for Binocular Eye Tracking and Calibration in Head-Mounted Displays", Multimedia, ACM, 2 Penn Plaza, Suite 701, New York, NY, 10121-0701, USA, Oct. 13, 2015 (Oct. 13, 2015), pp. 15-24, XP058509693, DOI: 10.1145/2733373.2806265, ISBN: 978-1-4503-3459-4, figure 2.
International Search Report and Written Opinion—PCT/US2021/071772—ISA/EPO—dated Mar. 21, 2022.

* cited by examiner

*Primary Examiner* — Dmitriy Bolotin
(74) *Attorney, Agent, or Firm* — Qualcomm Incorporated

(57) ABSTRACT

In some aspects, an eye tracking device may produce, using an infrared lighting device outside of a lens module, infrared light to illuminate an eye of a user for eye tracking. The eye tracking device may direct, using a substrate having a light directing mechanism, the infrared light reflected from the eye of the user towards an eye tracking camera within the lens module. The eye tracking device may perform, using the eye tracking camera, eye tracking on the eye of the user. Numerous other aspects are provided.

30 Claims, 13 Drawing Sheets

EYE TRACKING USING A LIGHT DIRECTING MECHANISM

FIELD OF THE DISCLOSURE

Aspects of the present disclosure generally relate to eye tracking and, for example, to eye tracking using a light directing mechanism.

BACKGROUND

A head mounted display may provide information for display to a user wearing the head mounted display. The head mounted display may include a camera to track an eye of the user. Eye tracking may involve measuring a gaze direction of the eye (e.g., a direction in which the eye is looking) or eye motion relative to a head of the user. Eye tracking may involve measuring eye positions and eye movements. The camera in the head mounted display may track the eye of the user based at least in part on images captured by the camera. In other words, when eye tracking is performed, the eye positions and/or eye movements may be detected based at least in part on the images captured by the camera.

SUMMARY

In some aspects, an eye tracking device includes a lens module that includes one or more lens elements; an infrared lighting device, outside of the lens module, configured to produce an infrared light capable of illuminating an eye of a user for eye tracking; an eye tracking camera within the lens module; and a substrate having a light directing mechanism configured to direct the infrared light reflected from the eye of the user towards the eye tracking camera.

In some aspects, an eye tracking device includes a lens module that includes one or more lens elements; an infrared lighting device, outside of the lens module, configured to produce an infrared light to illuminate an eye of a user for eye tracking; an eye tracking camera within the lens module; and a light directing mechanism, positioned on a surface of one of the one or more lens elements, configured to direct the infrared light reflected from the eye of the user towards the eye tracking camera.

In some aspects, a method includes producing, using an infrared lighting device outside of a lens module, infrared light to illuminate an eye of a user for eye tracking; directing, using a substrate having a light directing mechanism, the infrared light reflected from the eye of the user towards an eye tracking camera within the lens module; and performing, using the eye tracking camera, eye tracking on the eye of the user.

In some aspects, an apparatus includes means for producing, using an infrared lighting device outside of a lens module, an infrared light to illuminate an eye of a user for eye tracking; means for directing, using a substrate having a light directing mechanism, the infrared light reflected from the eye of the user towards an eye tracking camera within the lens module; and means for performing, using the eye tracking camera, eye tracking on the eye of the user.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
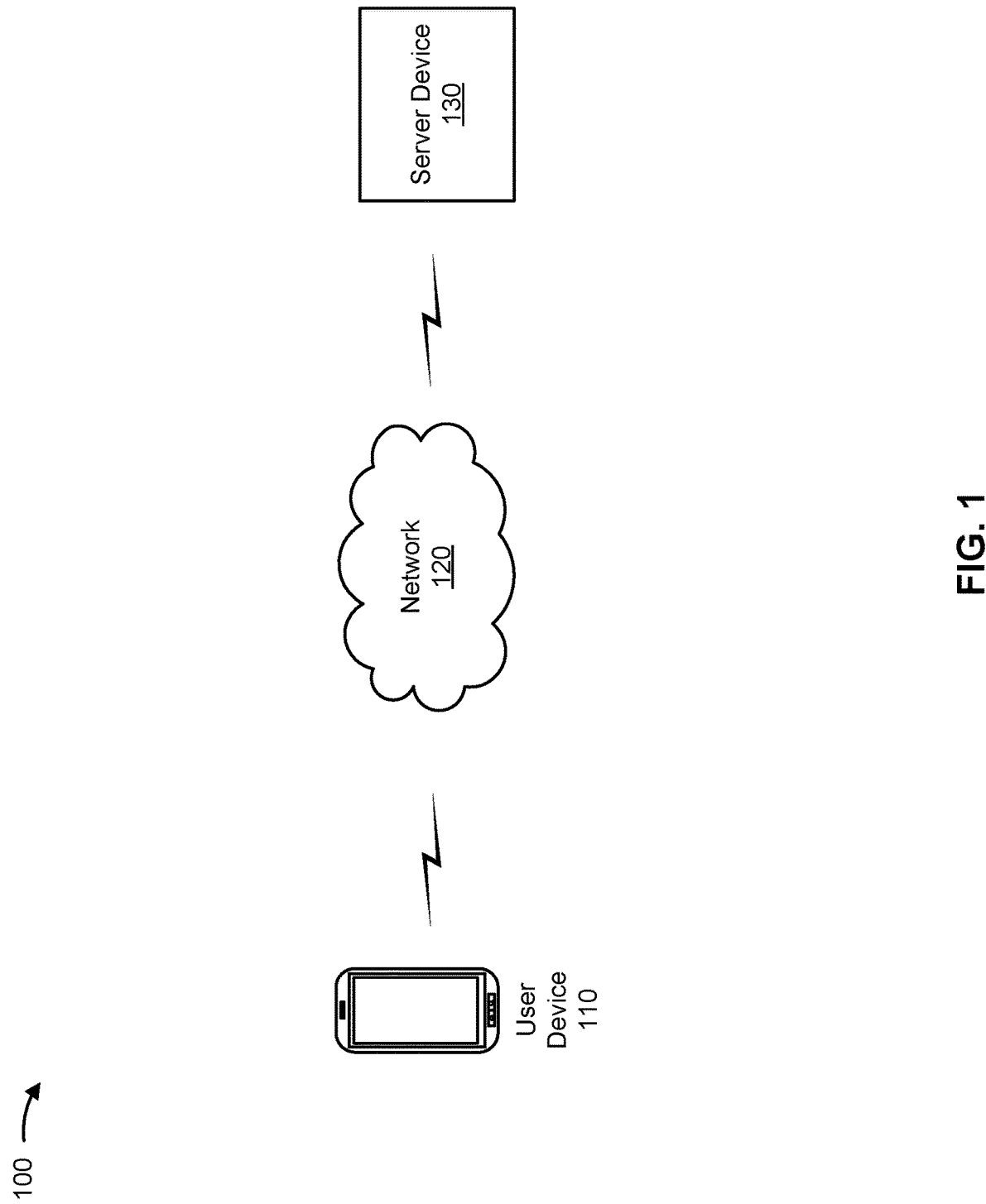
FIG. 1 is a diagram illustrating an example environment in which eye tracking using a light directing mechanism described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

An eye tracking device may include an infrared lighting device to illuminate an eye of a user with infrared light for eye tracking. The eye tracking device may include an infrared reflecting mirror to reflect the infrared light from the user to an eye tracking camera of the eye tracking device. The infrared reflecting mirror may enable the eye tracking camera to be placed outside of a field of view of the user. The infrared reflecting mirror, although consuming a relatively large amount of space, may be accommodated because a size of a lens module which includes the infrared reflecting mirror may also be relatively large in size. However, the relatively large size of the lens module may be bulky in a head mounted display, such as augmented reality (AR) or virtual reality (VR) eyewear. While smaller lens modules (e.g., pancake lens modules) are available, such lens modules do not have sufficient space to accommodate the infrared reflecting mirror, and as a result, the eye tracking camera may be undesirably placed within the field of view of the user. Alternatively, the eye tracking camera may be placed at a relatively large angle relative to the user, which may cause certain problems (e.g., eyelashes of the user may obscure a camera view of the eye), which may degrade a performance of the eye tracking.

In various aspects of techniques and apparatuses described herein, an eye tracking device may include a lens module with one or more lens elements. The lens module may be a pancake lens module. The lens module may include an eye tracking camera, which may be outside of a field of view of a user. The lens module may include a substrate and a light turning mechanism associated with the substrate. The light turning mechanism may direct infrared light reflected from an eye of the user to the eye tracking camera. The light turning mechanism may be a mirror coupled to the substrate, a film coupled to the substrate, an angled slit that is at least partially extended into the substrate, a facet associated with the substrate, a facet patch associated with the substrate, a trough extended into the substrate, or one or more grooves extended into the substrate. The eye tracking camera may produce an image of the eye of the user based at least in part on the infrared light directed towards the eye tracking camera by the light directing mechanism. By employing the substrate with the light directing mechanism, the eye tracking camera may be placed within the lens module and outside of the field of view of the user. As a result, certain situations (e.g., eyelashes of the user obscuring a camera view of the eye) may be avoided, thereby improving the performance of the eye tracking.

FIG. 1 is a diagram of an example environment 100 in which systems and/or methods for eye tracking using a light directing mechanism described herein may be implemented. As shown in FIG. 1, environment 100 may include a user device 110, a network 120, and a server device 130. Devices of environment 100 may interconnect via wired connections, wireless connections, or a combination of wired and wireless connections.

User device 110 may include one or more devices capable of receiving, generating, storing, processing, and/or providing information, such as information described herein. For example, user device 110 may include a head mounted display, a computing device (e. g., a desktop computer, a laptop computer, a tablet computer, a handheld computer, a server, and/or the like), a mobile phone (e.g., a smart phone, a radiotelephone, and/or the like), or a similar device that employs eye tracking technology as described herein. In some implementations, user device 110 may receive information from and/or transmit information to server device 130.

Network 120 may include one or more wired and/or wireless networks. For example, network 120 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of those or other types of networks.

Server device 130 may include one or more devices capable of receiving, generating, storing, processing, and/or providing information, such as information described herein. For example, server device 130 may include a computing device, such as a server, a desktop computer, a laptop computer, a tablet computer, a handheld computer, or a similar device.

The number of devices and networks shown in FIG. 1 is provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, one or more of the devices of environment 100 may perform one or more functions described as being performed by another one or more devices of environment 100.

Figure 2:
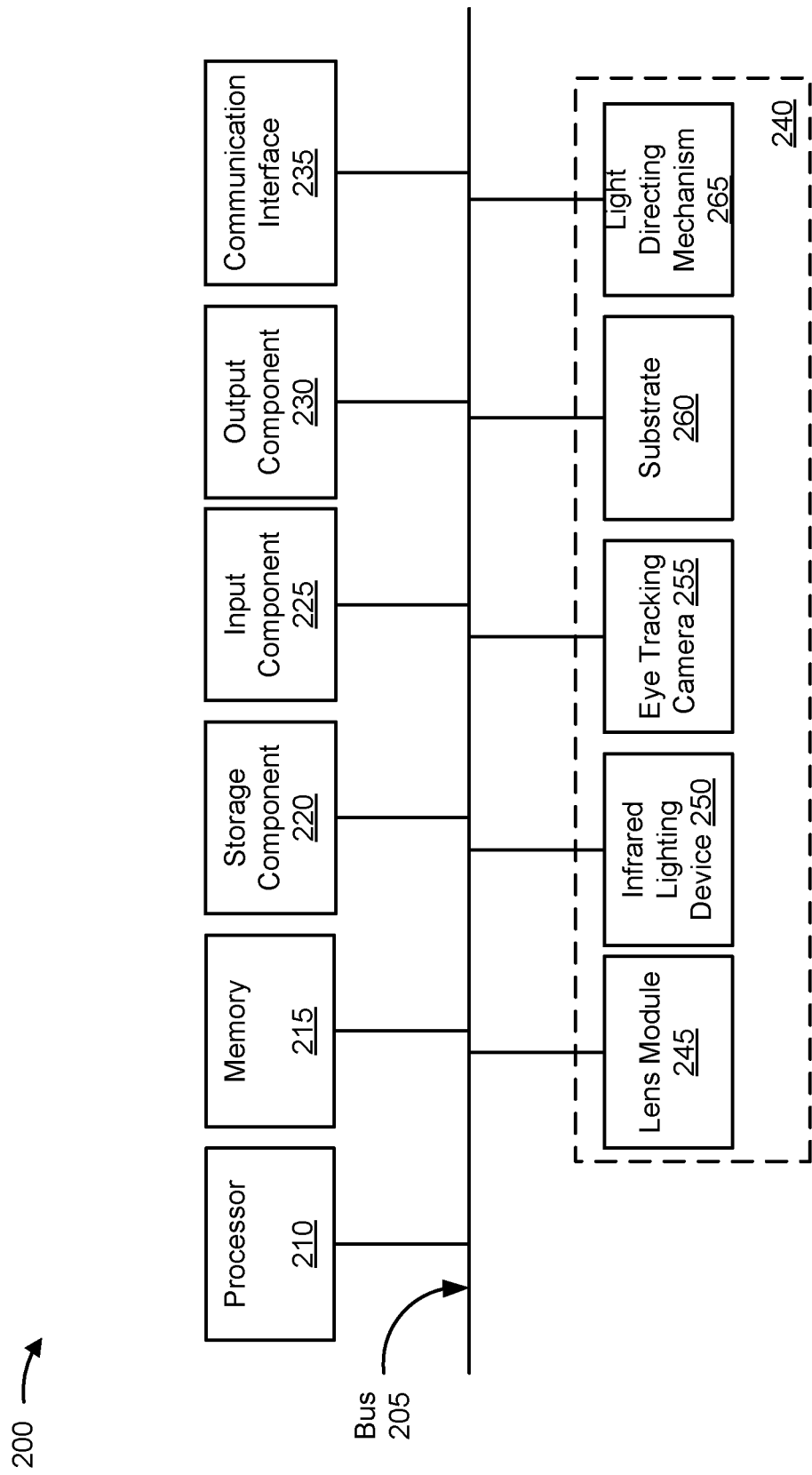
FIG. 2 is a diagram illustrating example components of one or more devices shown in FIG. 1, such as an eye tracking device, in accordance with various aspects of the present disclosure.

FIG. 2 is a diagram illustrating example components of a device 200, in accordance with various aspects of the present disclosure. Device 200 may correspond to user device 110, which may be a head mounted display. In some aspects, user device 110 may include one or more devices 200 and/or one or more components of device 200. As shown in FIG. 2, device 200 may include a bus 205, a processor 210, a memory 215, a storage component 220, an input component 225, an output component 230, a communication interface 235, or an eye tracking device 240. The eye tracking device 240 may include a lens module 245, an infrared lighting device 250, an eye tracking camera 255, a substrate 260, and a light directing mechanism 265.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component, a global navigation satellite system (GNSS) component, and/or the like) a sensor for sensing information (e.g., an accelerometer, a gyroscope, an actuator, another type of position or environment sensor, and/or the like)). Output component 230 includes a component that provides output information from device 200 (e.g., a display, a speaker, a haptic feedback component, an audio or visual indicator, and/or the like).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), a cellular network interface, and/or the like.

The lens module 245 may include one or more lens elements. The lens module 245 may be a pancake lens module. The infrared lighting device 250 may be outside of the lens module 245, and the infrared lighting device 250 may be configured to produce an infrared light capable of illuminating an eye of a user for eye tracking. The eye tracking camera 255 may be within the lens module 245.

The substrate 260 may be associated with the light directing mechanism 265, which may be configured to direct the infrared light reflected from the eye of the user towards the eye tracking camera 255. The substrate 260 may be transparent or semi-transparent to infrared light and visible light. The substrate 260 may be a glass substrate or a plastic substrate.

The light directing mechanism 265 may be a mirror coupled to the substrate 260, a film coupled to the substrate 260, or an angled slit that is at least partially extended into the substrate 260. The film coupled to the substrate 260 may be a diffractive film or a holographic film.

The light directing mechanism 265 may be a facet associated with the substrate 260, a facet patch associated with the substrate 260, a trough extended into the substrate 260, or one or more grooves extended into the substrate 260. The one or more grooves extended into the substrate 260 may correspond to a series of parallel grooves along an axis. The facet patch associated with the substrate 260 may include a first facet patch corresponding to a first axis and a second facet patch corresponding to a second axis.

The eye tracking camera 255 may produce a first image of at least a portion of the eye of the user based at least in part on a detection of the infrared light at a first angle. The eye tracking camera 255 may produce a second image of at least a portion of the eye of the user based at least in part on the detection of the infrared light at a second angle, where the first image and the second image are along an axis. A center between the first image and the second image may be related to a gaze angle of the eye of the user along the axis. The axis may be a horizontal axis or a vertical axis.

The eye tracking camera 255 may be a first eye tracking camera and the light directing mechanism 265 may be a first light directing mechanism. A second eye tracking camera and a second light directing mechanism may be included, where the first light directing mechanism may be perpendicular to the second light directing mechanism. The first eye tracking camera and the first light directing mechanism may perform eye tracking along a first axis, and the second eye tracking camera and the second light directing mechanism may perform eye tracking along a second axis.

Device 200 may perform one or more processes described herein. Device 200 may perform these processes based on processor 210 executing software instructions stored by a non-transitory computer-readable medium, such as memory 215 and/or storage component 220. "Computer-readable medium" is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for producing, using an infrared lighting device outside of a lens module, infrared light to illuminate an eye of a user for eye tracking; means for directing, using a substrate having a light directing mechanism, the infrared light reflected from the eye of the user towards an eye tracking camera within the lens module; and/or means for performing, using the eye tracking camera, eye tracking on the eye of the user. In some aspects, such means may include one or more components of device 200 described in connection with FIG. 2, such as bus 205, processor 210, memory 215, storage component 220, input component 225, output component 230, communication interface 235, and/or eye tracking device 240, and/or the like.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Eye tracking solutions may be used to track a position or movement of an eye of a user. Eye tracking may be employed in a head mounted display, such as AR or VR eyewear. For example, the head mounted display may include cameras that are attached to a frame of the head mounted display, and the cameras may be directed inwards towards the eye of the user. Infrared light emitting diodes (LEDs) may be mounted in the frame of the head mounted display to illuminate the eye of the user for eye tracking.

Figure 3:
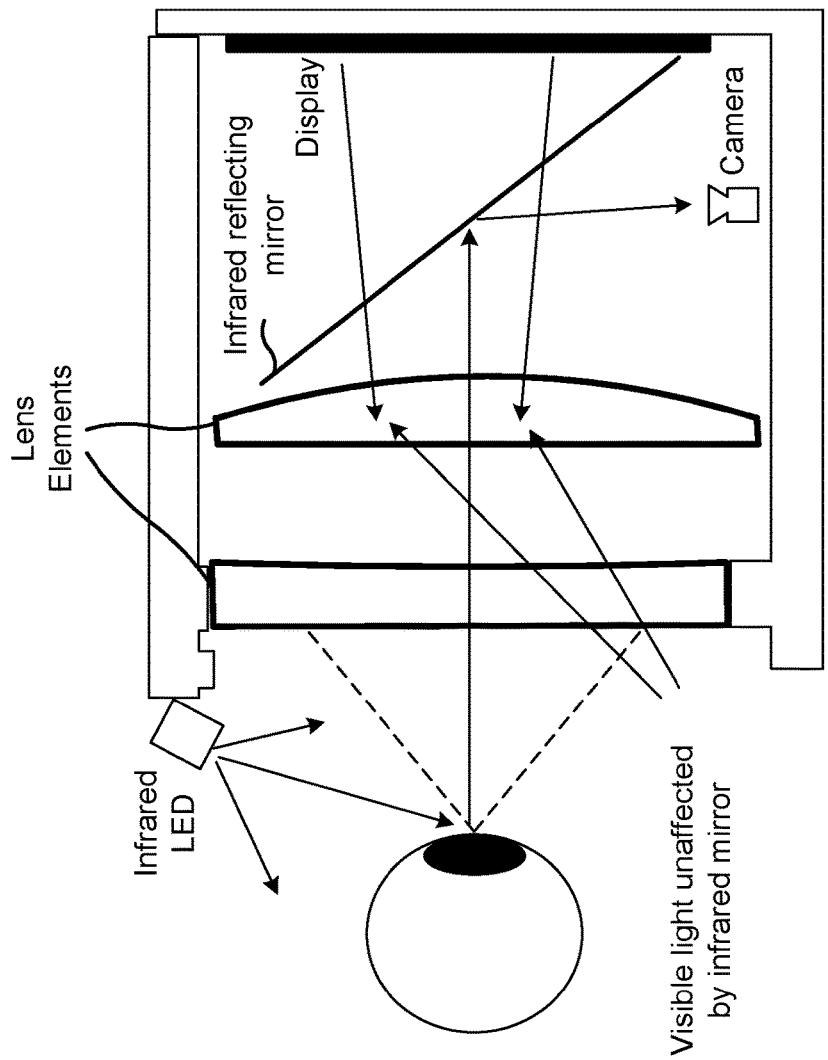
FIGS. 3-4 are diagrams illustrating examples associated with eye tracking, in accordance with various aspects of the present disclosure.

FIG. 3 is a diagram illustrating an example 300 of eye tracking. An eye tracking device may include one or more lens elements associated with a lens, an infrared LED, an infrared reflecting mirror, an eye tracking camera, and a display. The infrared LED may illuminate an eye of a user with infrared light. The infrared reflecting mirror may be used to enable a placement of the eye tracking camera outside of a field of view of a user. The infrared reflecting mirror may direct the infrared light reflected from the eye of the user to the eye tracking camera, while passing visible light emitted from the display. In other words, the visible light may be unaffected by the infrared reflecting mirror. The eye tracking camera may capture an image of the eye of the user based at least in part on the infrared light reflected from the eye of the user, and the image may be used to perform eye tracking on the eye of the user.

In the eye tracking device, the eye tracking camera may be within the lens, and therefore outside of the field of view of the user. The eye tracking camera may be able to be within the lens and outside of the field of view of the user based at least in part on the infrared reflecting mirror within the lens. The infrared reflecting mirror may direct or turn light approximately ninety degrees out of the field of view of the user and towards the eye tracking camera.

As indicated above, FIG. 3 is provided as an example. Other examples may differ from what is described with regard to FIG. 3.

Figure 4:
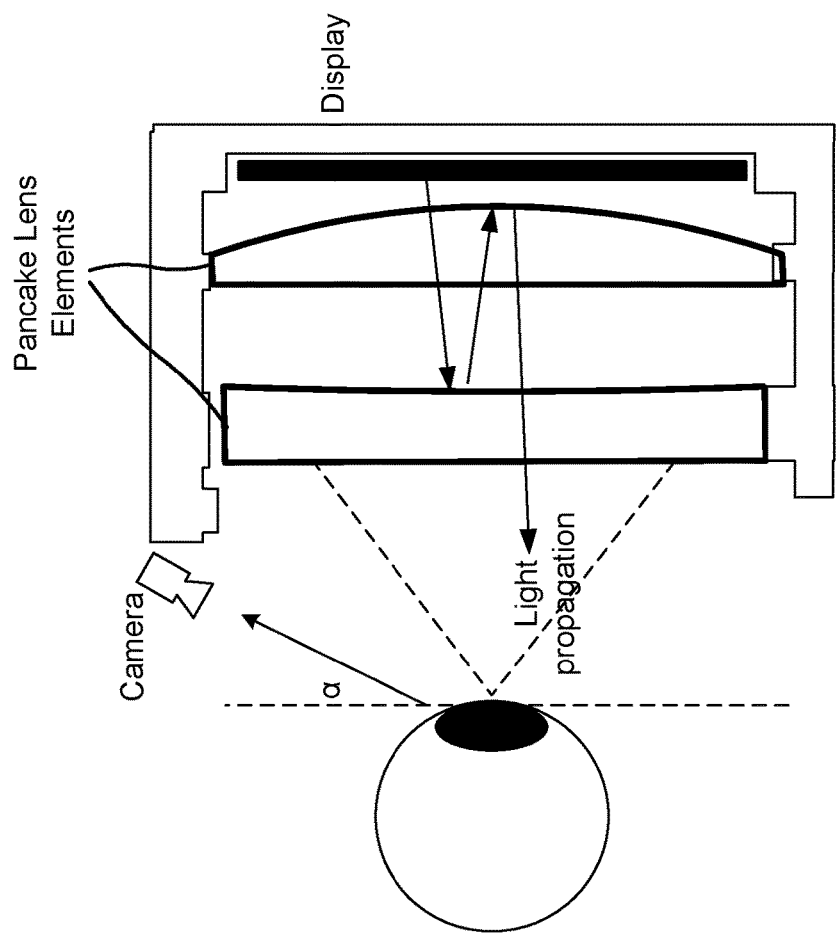

FIG. 4 is a diagram illustrating an example 400 of eye tracking. An eye tracking device may include a pancake lens having one or more pancake lens elements, an eye tracking camera, and a display. The eye tracking camera may be placed on an outside of the pancake lens. The eye tracking camera may capture an image of an eye of a user, and the image may be used to perform eye tracking on the eye of the user.

As shown in FIG. 4, the pancake lens may include one or more pancake lens elements with partially reflective surfaces, which may cause light to reflect several times before exiting the pancake lens. For example, an optical path of light rays in the pancake lens may involve light reflecting from a surface of a first pancake lens element, reflecting off a surface of a second pancake lens element, and then propagating to an outside of the pancake lens.

The pancake lens may offer various advantages over a non-pancake lens. For example, the pancake lens may be smaller in size as compared to the non-pancake lens. The pancake lens may be less efficient as compared to the non-pancake lens, as the pancake lens may achieve approximately a 10% transmittance of light, which may be less than a transmittance associated with a non-pancake lens. However, the pancake lens may occupy a reduced amount of space as compared to the non-pancake lens, as the one or more pancake lens elements may be positioned closer to the display as compared to when the non-pancake lens is used. The reduced amount of space occupied by the pancake lens may be beneficial for a head mounted display, but may leave insufficient room for an infrared reflecting mirror.

As shown in FIG. 4, in the eye tracking device, the eye tracking camera may be placed on the outside of the pancake lens. The eye tracking camera may be placed outside of a field of view of the user to avoid obstructing the field of view of the user. As a result, the eye tracking camera may be directed to the eye of the user at a large angle (a), such as an angle greater than 40 degrees. At this larger angle, certain user features may obscure an eye tracking camera view of the eye. For example, eyelashes of the user may obscure the eye tracking camera view of the eye, thereby resulting in an inability to perform eye tracking on the eye of the user and/or reduced accuracy when performing eye tracking.

As indicated above, FIG. 4 is provided as an example. Other examples may differ from what is described with regard to FIG. 4.

Figure 5:
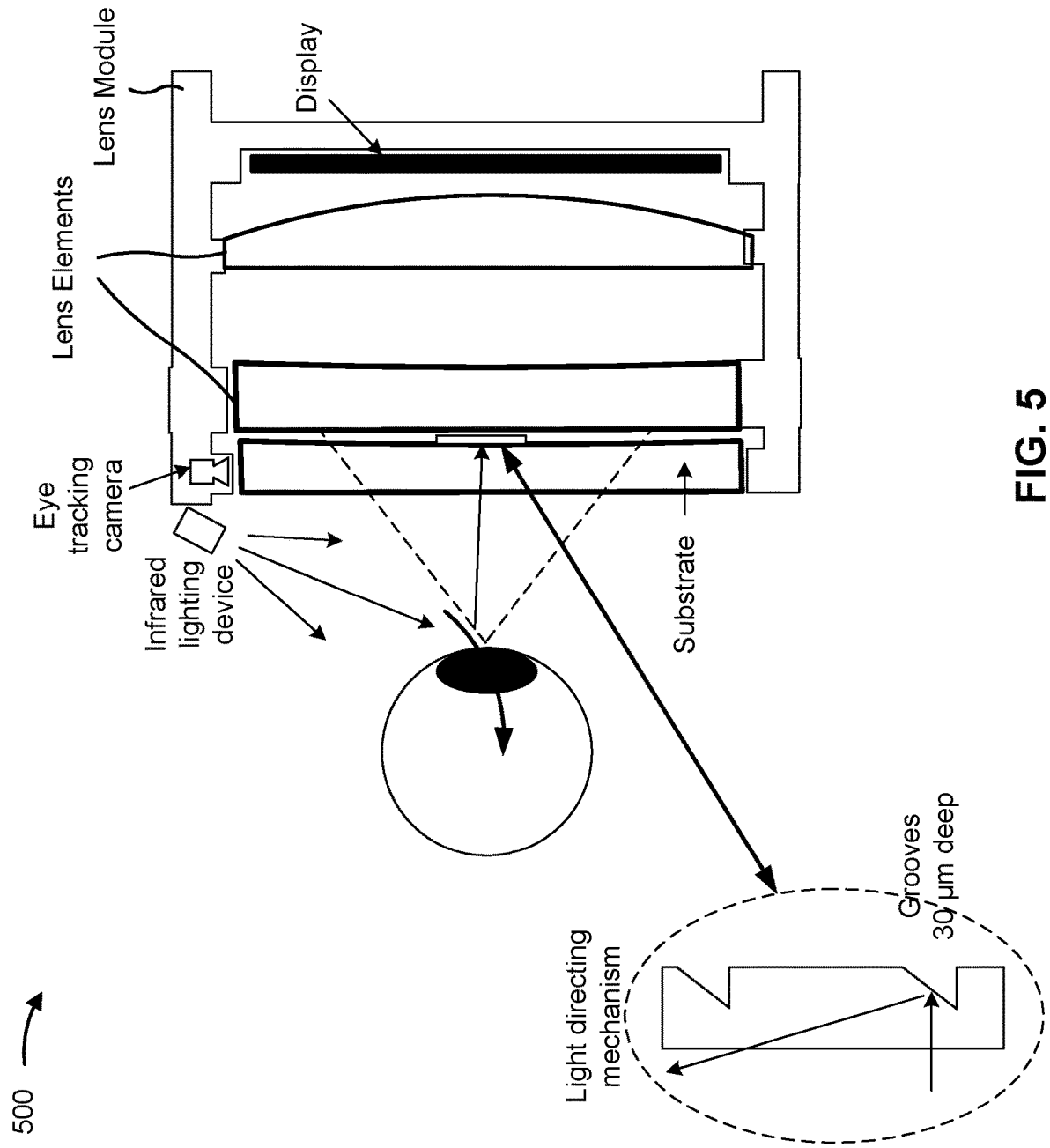
FIGS. 5-12 are diagrams illustrating examples associated with eye tracking using a light directing mechanism, in accordance with various aspects of the present disclosure.

FIG. 5 is a diagram illustrating an example 500 of eye tracking using a light directing mechanism, in accordance with various aspects of the present disclosure.

As shown in FIG. 5, an eye tracking device (e.g., an eye tracking device 240) may include a lens module (e.g., lens module 245), an infrared lighting device (e.g., infrared lighting device 250), an eye tracking camera (e.g., eye tracking camera 255), a substrate (e.g., substrate 260), a light directing mechanism (e.g., light directing mechanism 265), and a display. The eye tracking device may be included in a user device (e.g., user device 110), such as a head mounted display, for tracking an eye of a user using the user device.

In some aspects, the lens module may include one or more lenses or one or more lens elements. In some aspects, the lens module may be a pancake lens module having one or more pancake lens elements. A "pancake lens", as described herein, may refer to a relatively flat, thin lens or series of lenses for use in the eye tracking device.

In some aspects, the infrared lighting device may be outside of the lens module. The infrared lighting device may be an infrared LED. The infrared lighting device may produce an infrared light capable of illuminating an eye of a user for eye tracking. The eye tracking camera may be within the lens module. The substrate may include or be associated with the light directing mechanism. The light directing mechanism may direct or turn the infrared light reflected from the eye of the user towards the eye tracking camera. The eye tracking camera may be positioned above the substrate, such that the eye tracking camera may capture infrared light from the light directing mechanism. The eye tracking camera may capture an image based at least in part on the infrared light reflected from the eye of the user, and the image may be used to perform eye tracking on the eye of the user.

In some aspects, the substrate may be transparent or semi-transparent to infrared light and visible light. The substrate may be a glass substrate or a plastic substrate. The substrate may be positioned below the eye tracking camera.

As an example, the substrate may have a width of approximately three millimeters. A distance between the eye of the user and a front surface of the substrate may be approximately ten millimeters. A distance between a back surface of the substrate and the display may be approximately 18 millimeters. The distance between the back surface of the substrate and the display may include the one or more lens elements. A height of the substrate and the one or more lens elements within the lens module may be approximately 40 millimeters.

In some aspects, the light directing mechanism may be a mirror coupled to the substrate, and the mirror may direct the infrared light reflected from the eye of the user towards the eye tracking camera. In some aspects, the light directing mechanism may be a film coupled to the substrate, and the film may direct the infrared light reflected from the eye of the user towards the eye tracking camera. The film may be a diffractive film or a holographic film. In some aspects, the light directing mechanism may be an angled slit that is at least partially extended into the substrate, and the angled slit may direct the infrared light reflected from the eye of the user towards the eye tracking camera.

In some aspects, the light directing mechanism may be a facet associated with the substrate, and the facet may direct the infrared light reflected from the eye of the user towards the eye tracking camera. In some aspects, the facet may be formed into a film that is laminated to the substrate. In some aspects, the light directing mechanism may be a facet patch associated with the substrate, and the facet patch may direct the infrared light reflected from the eye of the user towards the eye tracking camera. In some aspects, the light directing mechanism may be a trough extended into the substrate, and the trough may direct the infrared light reflected from the eye of the user towards the eye tracking camera.

In some aspects, the light directing mechanism may be one or more grooves extended into the substrate, and the one or more grooves may direct the infrared light reflected from the eye of the user towards the eye tracking camera. The one or more grooves may correspond to a series of parallel grooves along an axis (e.g., a horizontal axis). In some aspects, the one or more grooves may be machined or printed into a surface of the substrate, or the one or more grooves may be embossed into a film which is laminated to the surface of the substrate.

As further shown in FIG. 5, the light directing mechanism may be a series of grooves that are each approximately 30 microns (μm) deep. Infrared light reflected from the eye of the user may strike the grooves, and the grooves may cause the infrared light to be directed or turned towards the eye tracking camera.

In some aspects, a groove depth may vary from ten microns to 500 microns. An angle of a groove apex may be approximately 45 degrees. The grooves may extend across the surface of the substrate. The grooves may or may not be centered on the substrate. The grooves may be offset in a direction perpendicular to a length of the grooves.

As indicated above, FIG. 5 is provided as an example. Other examples may differ from what is described with regard to FIG. 5.

Figure 6:
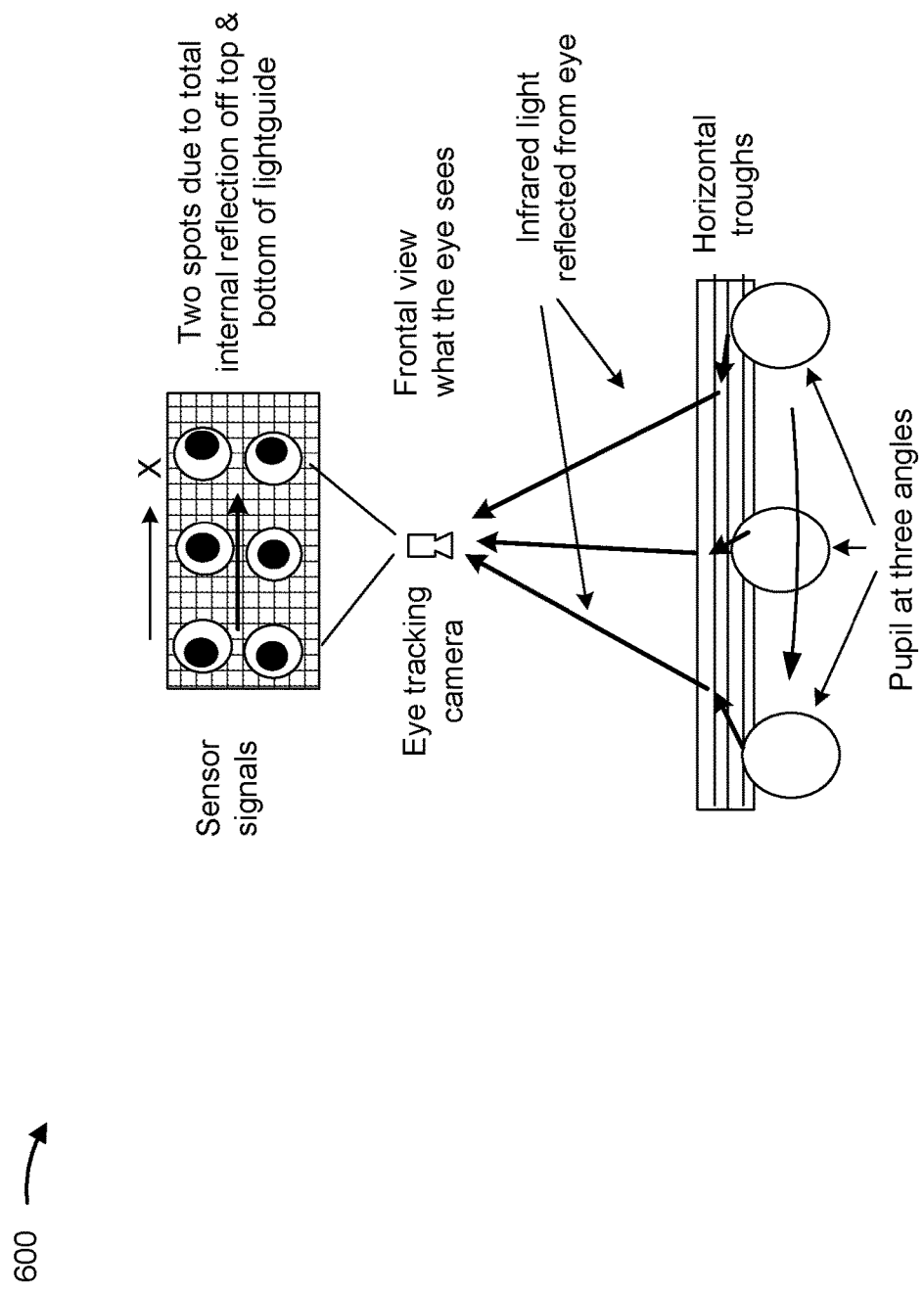

FIG. 6 is a diagram illustrating an example 600 of eye tracking using a light directing mechanism, in accordance with various aspects of the present disclosure.

In some aspects, an infrared lighting device in a user device (e.g., a head mounted display) may produce an infrared light capable of illuminating an eye of a user. The infrared light emitted from the infrared lighting device may have a wavelength of approximately 850 nanometers (nm). The infrared lighting device may be outside of a lens module. A light directing mechanism associated with a substrate may direct or turn the infrared light reflected from the eye of the user towards an eye tracking camera. The eye tracking camera may capture an image based at least in part on the infrared light reflected from the eye of the user, and the image may be used to perform eye tracking on the eye of the user.

In some aspects, the eye tracking camera may produce a first image of at least a portion of the eye of the user based at least in part on a detection of the infrared light at a first angle. The eye tracking camera may produce a second image of at least a portion of the eye of the user based at least in part on the detection of the infrared light at a second angle. The first image and the second image may be along an axis, such as a horizontal axis. A center between the first image and the second image may be related to a gaze angle of the eye of the user along the axis.

As shown in FIG. 6, the eye of the user may be captured for three different angles. At a first angle, infrared light may be directed from the light directing mechanism (e.g., a series of horizontal troughs), and the infrared light may be captured by the eye tracking camera. The infrared light may strike a sensor of the eye tracking camera at two angles due to a total internal reflection of the infrared light, which may result in two images being produced at the eye tracking camera. The two images may correspond to the eye of the user, and may correspond to the first angle. The two images may correspond to an axis, such as a horizontal axis. Similarly, the eye tracking camera may capture two images of the eye of the user at each of a second angle and a third angle. In this example, the first angle may correspond to the eye of the user looking in a left direction, the second angle may correspond to the eye of the user looking straight, and the third angle may correspond to the eye of the user looking in a right direction.

In some aspects, the infrared light may be reflected or scattered from the eye and strike the light directing mechanism (e.g., an angled groove or facets on the substrate). The reflected or scattered infrared light may undergo total internal reflection at the light directing mechanism (or air interface). Infrared light may be trapped in the substrate and propagate towards the eye tracking camera, which may be located at an edge of the substrate. The infrared light may strike the light directing mechanism (e.g., the angled groove or facets on the substrate) at a range of incident angles, which may be maintained as the infrared light propagates in a lightguide towards the eye tracking camera.

In some aspects, infrared light may be reflected from both a top surface and a bottom surface of the light guide. As a result, when the eye tracking camera performs imaging based at least in part on the infrared light, the eye tracking camera may capture two separate images along a horizontal axis. A center of the two separate images may be associated with a same x position on the sensor of the eye tracking camera, where the x position may be directly related to the gaze angle of the eye along the horizontal axis.

In some aspects, depending on the light directing mechanism (e.g., a series of vertical troughs), the eye tracking camera may capture two separate images along a vertical axis. A center of the two separate images may be associated with a same y position on the sensor of the eye tracking camera, where they position may be directly related to the gaze angle of the eye along the vertical axis.

As indicated above, FIG. 6 is provided as an example. Other examples may differ from what is described with regard to FIG. 6.

Figure 7:
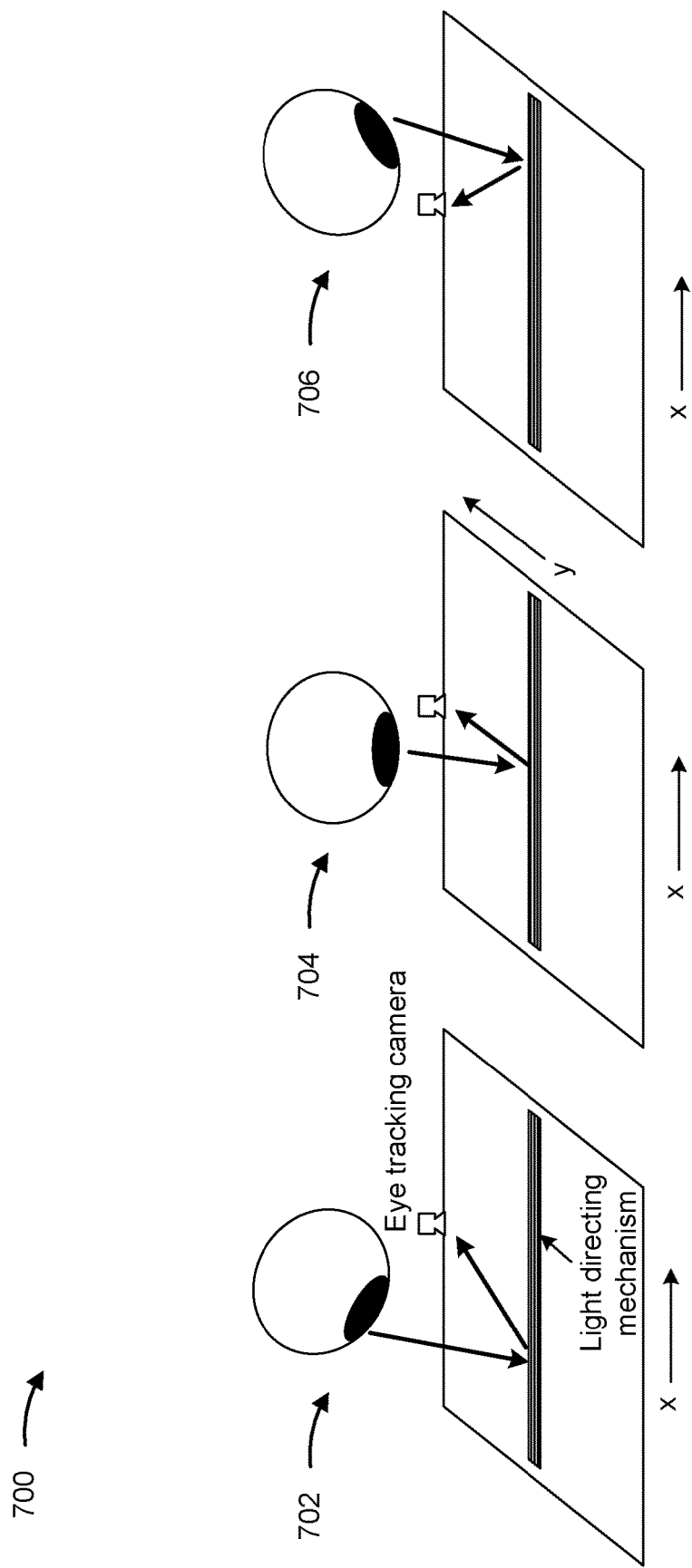

FIG. 7 is a diagram illustrating an example 700 of eye tracking using a light directing mechanism, in accordance with various aspects of the present disclosure.

As shown by reference numbers 702, 704, and 706, infrared light may be reflected or scattered from an eye of a user. The infrared light may strike a light directing mechanism, such as a series of horizontal grooves on a substrate. The infrared light may propagate towards an eye tracking camera located at an edge of the substrate. Depending on an angle associated with the eye of the user, the infrared light may strike the light turning mechanism at a small range of incident angles, which may be maintained as the infrared light propagates in a lightguide towards the eye tracking camera.

As indicated above, FIG. 7 is provided as an example. Other examples may differ from what is described with regard to FIG. 7.

Figure 8:
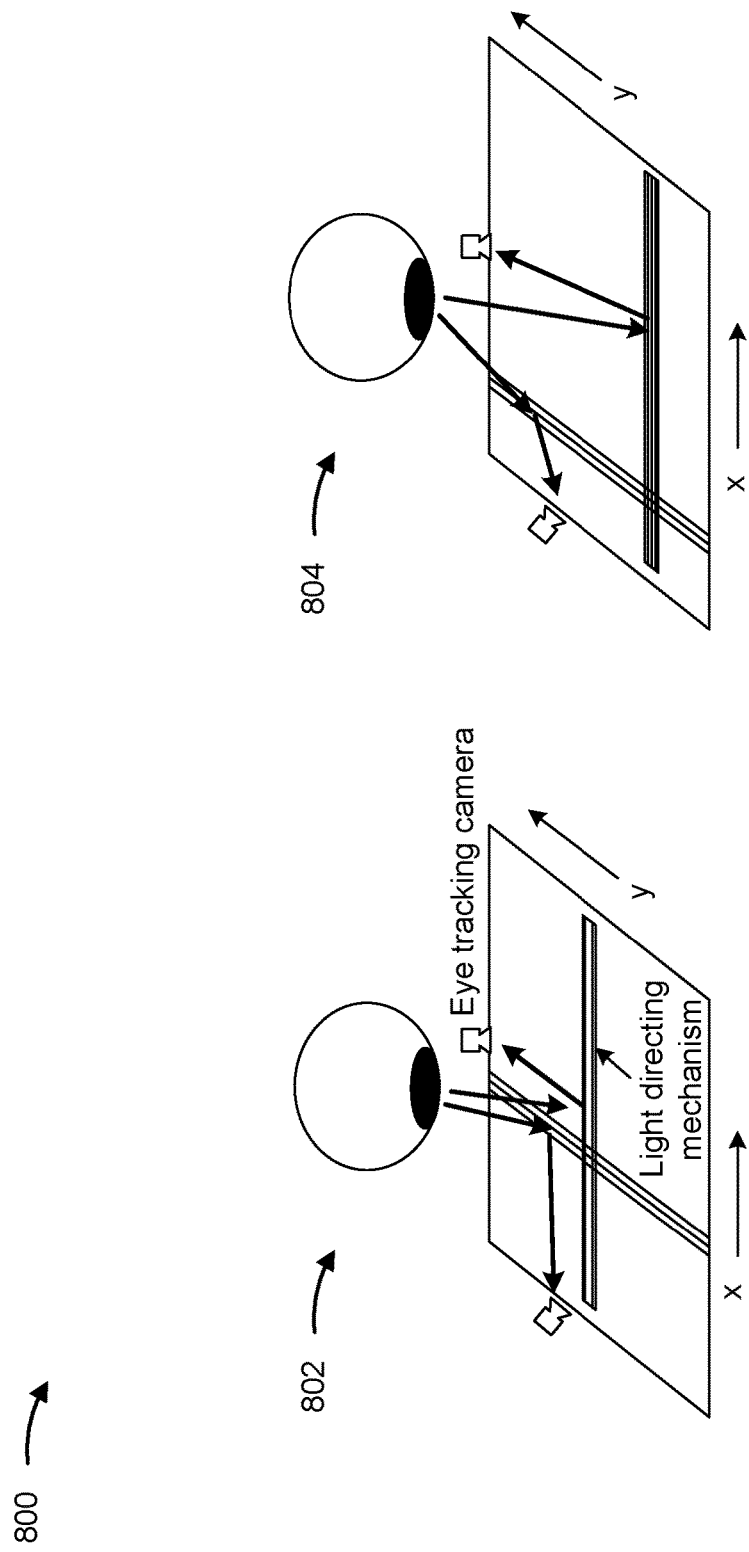

FIG. 8 is a diagram illustrating an example 800 of eye tracking using a light directing mechanism, in accordance with various aspects of the present disclosure.

As shown by reference number 802, infrared light may be reflected or scattered from an eye of a user. The infrared light may strike a first light directing mechanism, such as a series of horizontal grooves on a substrate. The infrared light may propagate towards a first eye tracking camera located at a first edge of the substrate. Further, the infrared light may strike a second light directing mechanism, such as a series of vertical grooves on the substrate. The second light directing mechanism may be perpendicular to the first light directing mechanism. The infrared light may propagate towards a second eye tracking camera located at a second edge of the substrate, where the second edge of the substrate may be adjacent to the first edge of the substrate.

In some aspects, the first light directing mechanism and the first eye tracking camera may be used to perform eye tracking along a first axis, such as a horizontal axis. The second light directing mechanism and the second eye tracking camera may be used to perform eye tracking along a second axis, such as a vertical axis. In other words, the first light directing mechanism and the first eye tracking camera may be used to determine an eye gaze angle of the user along the horizontal axis, and the second light directing mechanism and the second eye tracking camera may be used to determine an eye gaze angle of the user along the vertical axis.

As shown by reference number 804, the first light directing mechanism and/or the second light directing mechanism may be off-center of the substrate. In other words, the first light directing mechanism may not be positioned at a center of the substrate, and/or the second light directing mechanism may not be positioned at a center of the substrate.

In some aspects, two eye tracking cameras may be used to determine horizontal and vertical positions of the eye of the user, respectively, where a first eye tracking camera may be orthogonal to a second eye tracking camera. In some aspects, a single eye tracking camera may be used to determine the horizontal and vertical positions of the eye of the user. The single eye tracking camera may determine the horizontal position of the eye of the user, as described above. The single eye tracking camera may determine the vertical position of the eye of the user based at least in part on the vertical position of the eye on a sensor of the single eye tracking camera.

As indicated above, FIG. 8 is provided as an example. Other examples may differ from what is described with regard to FIG. 8.

Figure 9:
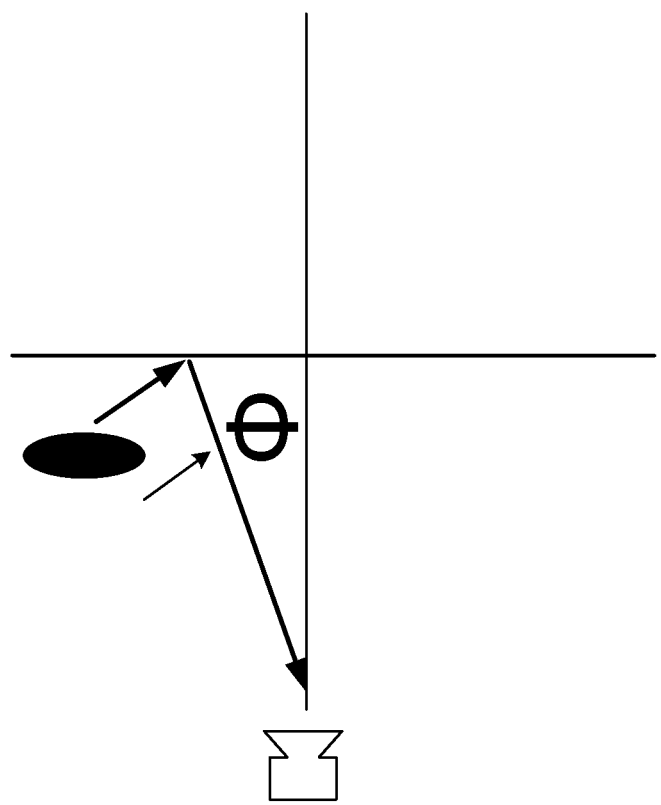

FIG. 9 is a diagram illustrating an example 900 of eye tracking using a light directing mechanism, in accordance with various aspects of the present disclosure.

As shown in FIG. 9, an angle (1) may be determined between infrared light reflected from an eye of a user and infrared light captured at an eye capturing device, when a lens module (e.g., a pancake lens module) is employed and the eye capturing device is positioned within the lens module. Further, the eye capturing device may detect the infrared light via a light directing mechanism associated with a substrate within the lens module. An angular resolution may be determined as a function of the angle 1. The angular resolution may be relatively constant across a field of view of the eye, such as over an entire horizontal shift of the eye. In some cases, the angular resolution may be less than 0.35 degrees, which may be less than eye tracking solutions that use an infrared reflecting mirror, which may be associated with angular resolutions that range from 0.5 degrees to 1.5 degrees.

As indicated above, FIG. 9 is provided as an example. Other examples may differ from what is described with regard to FIG. 9.

Figure 10:
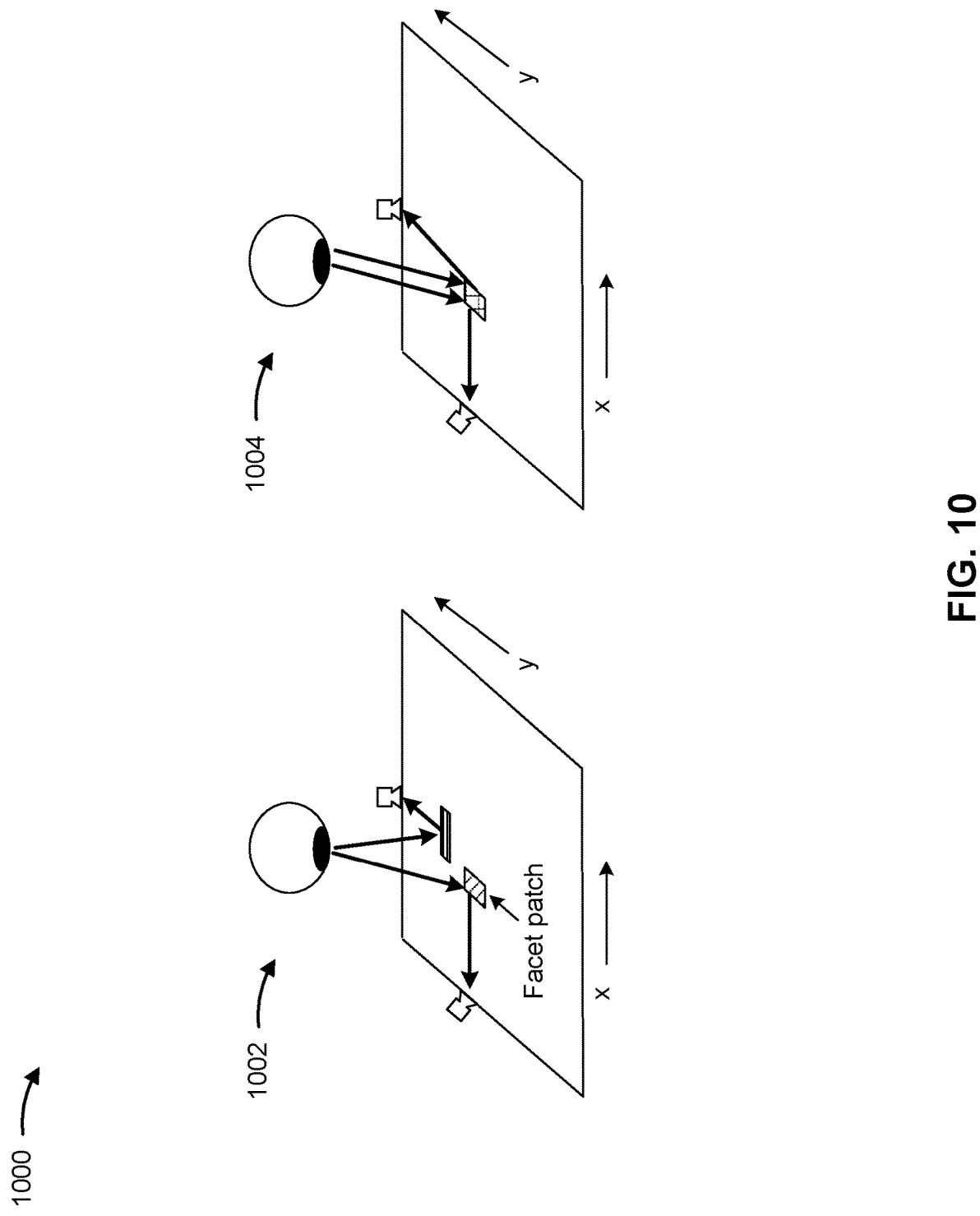

FIG. 10 is a diagram illustrating an example 1000 of eye tracking using a light directing mechanism, in accordance with various aspects of the present disclosure.

As shown by reference number 1002, infrared light may be reflected or scattered from an eye of a user. The infrared light may strike a first light directing mechanism, such as a first facet patch on a substrate corresponding to a horizontal axis. The infrared light may propagate towards a first eye tracking camera located at a first edge of the substrate. Further, the infrared light may strike a second light directing mechanism, such as a second facet patch on the substrate corresponding to a vertical axis. The second light directing mechanism may be perpendicular to the first light directing mechanism. The infrared light may propagate towards a second eye tracking camera located at a second edge of the substrate, where the second edge of the substrate may be adjacent to the first edge of the substrate. In this example, the first facet patch may be used to determine an eye gaze angle of the user along the horizontal axis, and the second facet patch may be used to determine an eye gaze angle of the user along the vertical axis. In other words, the first facet patch may be associated with a first eye gaze direction and the second facet patch may be associated with a second eye gaze direction that is orthogonal to the first eye gaze direction.

As shown by reference number 1004, infrared light may be reflected or scattered from an eye of a user. The infrared light may strike a light directing mechanism, such as a facet patch on a substrate. The facet patch may include multiple sets of orthogonal facets or grooves. The infrared light that strikes facets or grooves in the facet patch associated with a horizontal axis may be propagated towards a first eye tracking camera located at a first edge of the substrate. The infrared light that strikes facets or grooves in the facet patch associated with a vertical axis may be propagated towards a second eye tracking camera located at a second edge of the substrate.

As indicated above, FIG. 10 is provided as an example. Other examples may differ from what is described with regard to FIG. 10.

Figure 11:
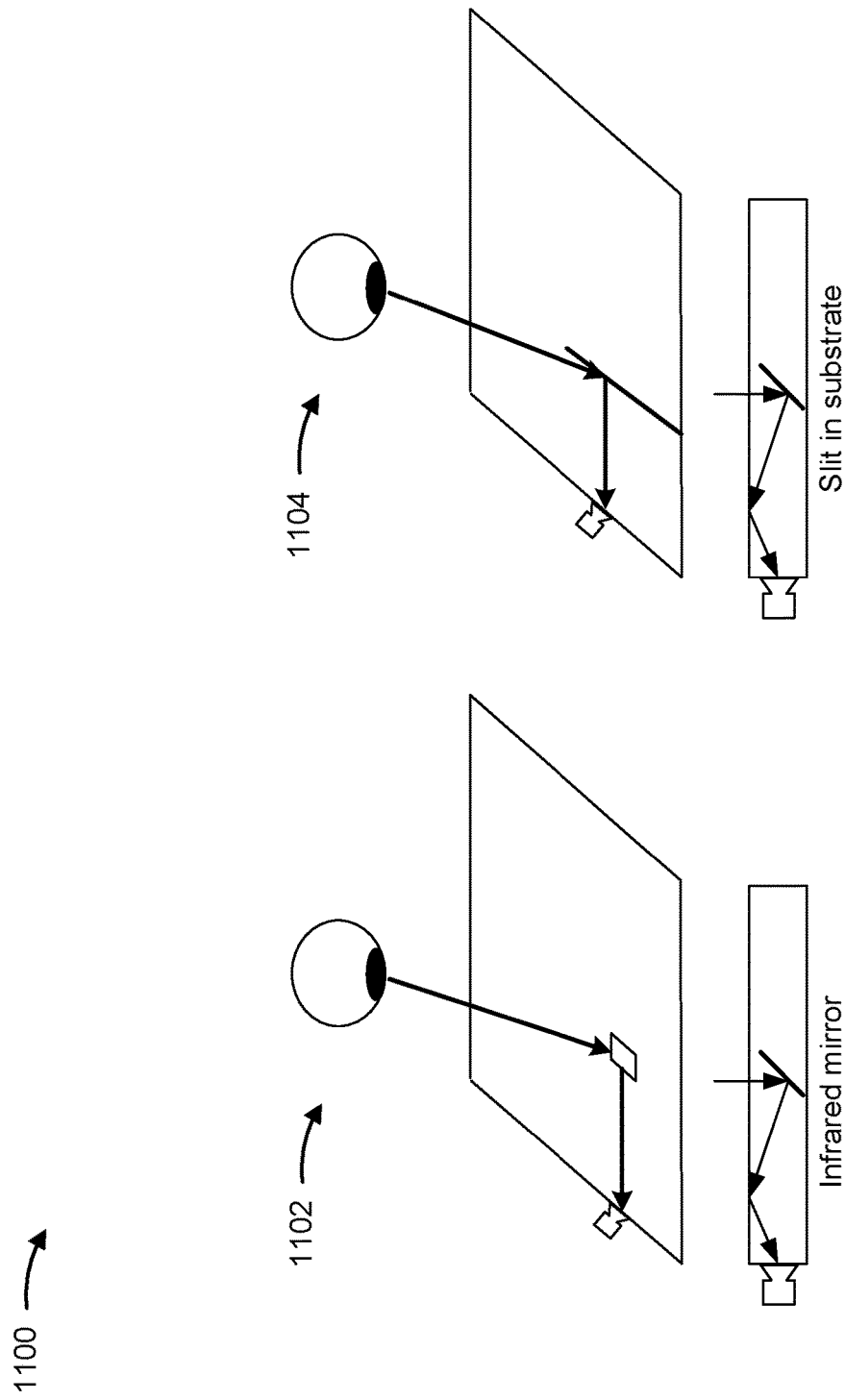

FIG. 11 is a diagram illustrating an example 1100 of eye tracking using a light directing mechanism, in accordance with various aspects of the present disclosure.

As shown by reference number 1102, infrared light may be reflected or scattered from an eye of a user. The infrared light may strike a light directing mechanism, such as an infrared mirror coupled to a substrate. As an example, the infrared mirror may be positioned at an angle (e.g., 45 degrees), and the infrared mirror may be embedded into or coupled to the substrate. The infrared mirror may be coated with an infrared reflector, which may allow the infrared mirror to pass visible light, which may prevent artifacts since the visible light may be transmitted without refraction. The infrared light that strikes the infrared mirror may be propagated towards an eye tracking camera located at an edge of the substrate.

As shown by reference number 1104, infrared light may be reflected or scattered from an eye of a user. The infrared light may strike a light directing mechanism, such as an angled slit at least partially extended into a substrate. The angled slit may not extend an entire width of the substrate, to preserve a mechanical strength of the substrate. The angled slit may not extend through an entire thickness of the substrate, to preserve the mechanical strength of the substrate. The infrared light may be totally internally reflected from a glass/air interface formed by the angled slit, and may be propagated towards an eye tracking camera located at an edge of the substrate.

As indicated above, FIG. 11 is provided as an example. Other examples may differ from what is described with regard to FIG. 11.

Figure 12:
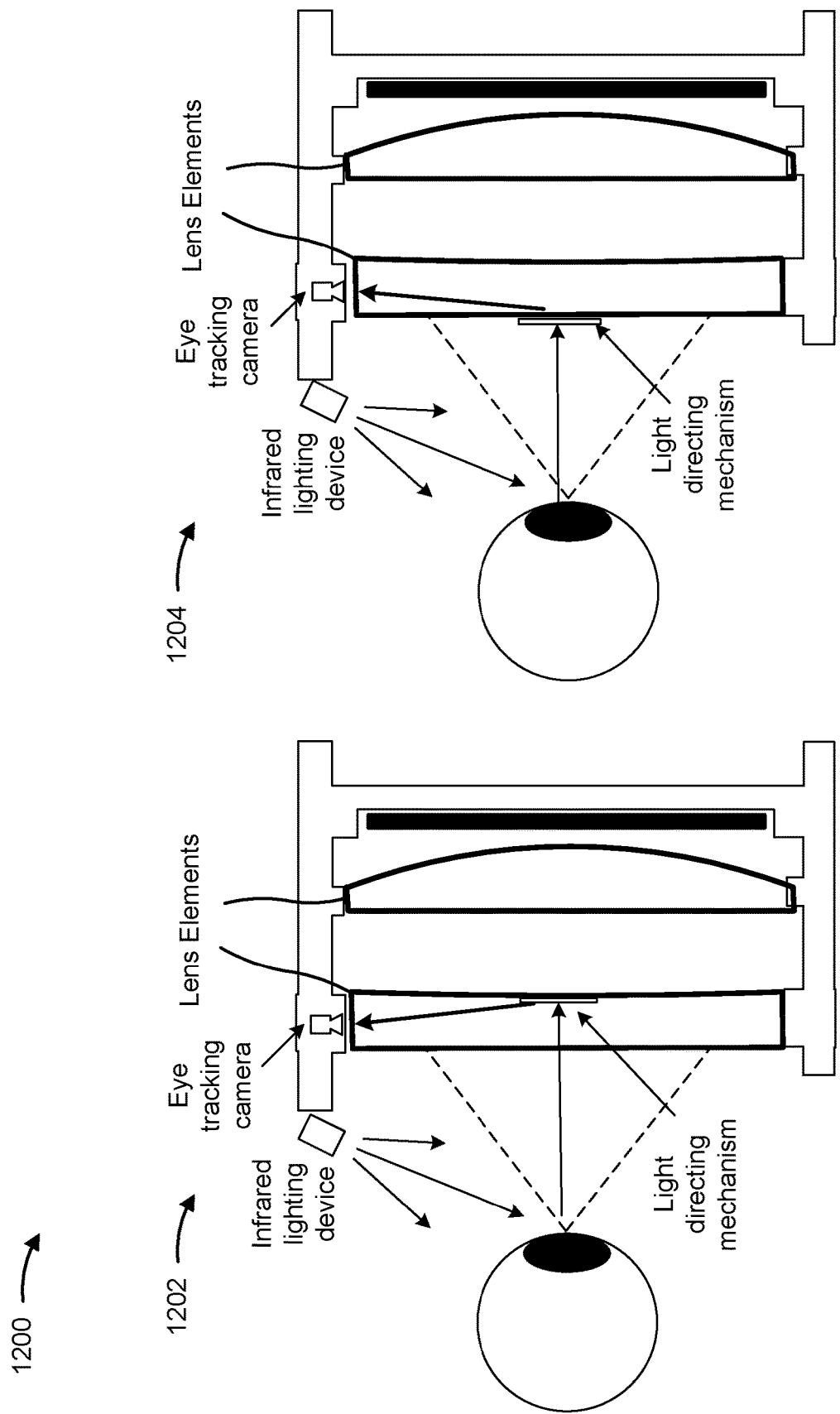

FIG. 12 is a diagram illustrating an example 1200 of eye tracking using a light directing mechanism, in accordance with various aspects of the present disclosure.

In some aspects, an eye tracking device may include a lens module, an infrared lighting device, an eye tracking camera, and a light directing mechanism. The eye tracking device may not include a substrate. Rather, the light directing mechanism may be a film (e.g., a light directing film), which may be coupled to a lens element of the lens module. In this example, infrared light reflected from an eye of a user may be directed by the film to the eye tracking camera.

In some aspects, as shown by reference number 1202, the film may be coupled to a front surface of a first lens element in the lens module. In some aspects, as shown by reference number 1204, the film may be coupled to a back surface of the first lens element in the lens module.

In some cases, coupling the film to a surface of the lens element may interfere with a function of dielectric coating on the surface of the lens element. However, this interference may be minimal when the film covers a relatively small area. In some cases, the film may be compatible with the dielectric coating, in which an additional substrate may not be added.

In some aspects, the surface of the lens element may be curved, in which case a film patch may be employed across the surface of the lens element instead of a film strip, as the film patch may more easily attach to the curved surface.

As indicated above, FIG. 12 is provided as an example. Other examples may differ from what is described with regard to FIG. 12.

Figure 13:
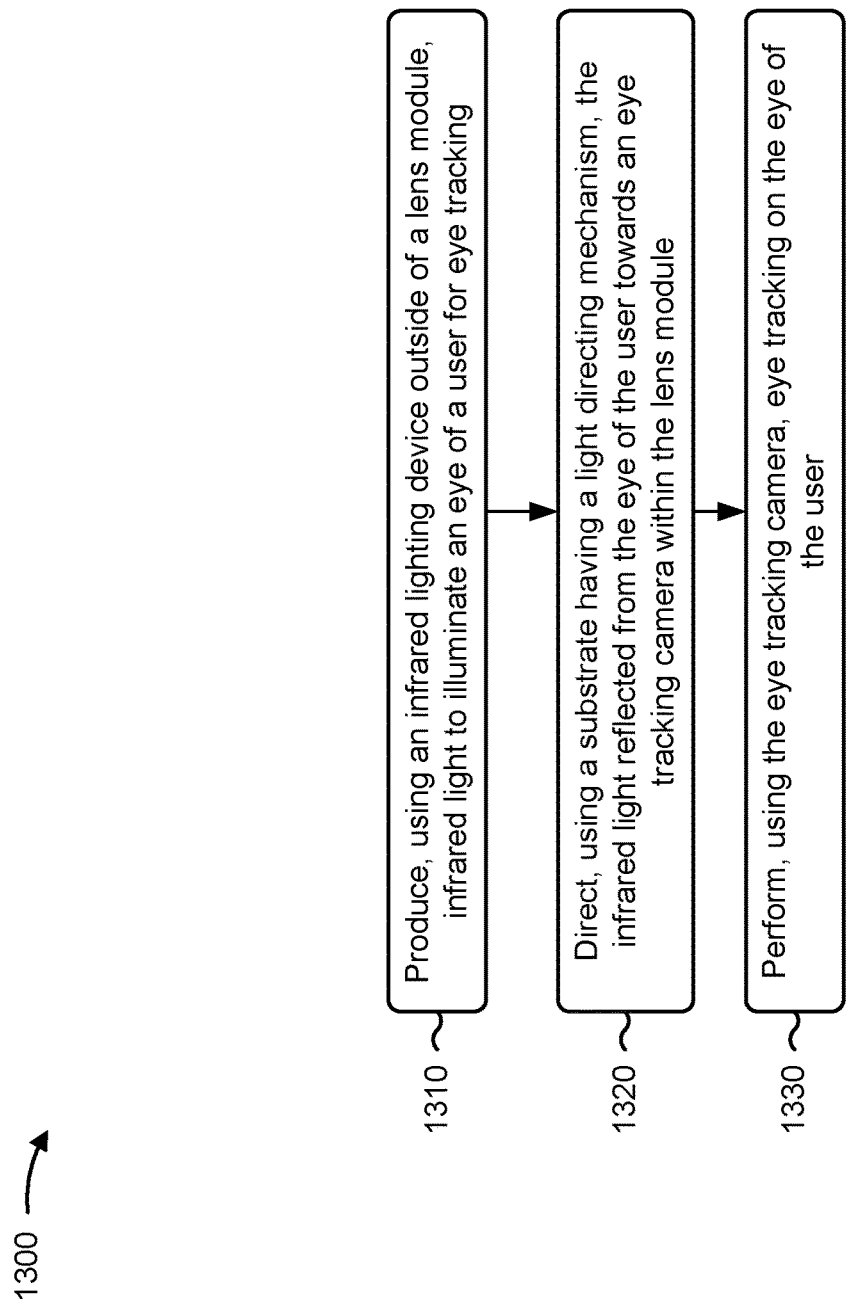
FIG. 13 is a flowchart of an example process associated with eye tracking using a light directing mechanism, in accordance with various aspects of the present disclosure.

FIG. 13 is a flowchart of an example process 1300 associated with eye tracking using a light directing mechanism. In some implementations, one or more process blocks of FIG. 13 may be performed by an eye tracking device (e.g., eye tracking device 240). In some implementations, one or more process blocks of FIG. 13 may be performed by another device or a group of devices separate from or including the eye tracking device, such as user device 110. Additionally, or alternatively, one or more process blocks of FIG. 13 may be performed by one or more components of device 200, such as processor 210, memory 215, storage component 220, input component 225, output component 230, and/or communication interface 235.

As shown in FIG. 13, process 1300 may include producing, using an infrared lighting device outside of a lens module, infrared light to illuminate an eye of a user for eye tracking (block 1310). For example, the eye tracking device may produce, using an infrared lighting device outside of a lens module, infrared light to illuminate an eye of a user for eye tracking, as described above.

As further shown in FIG. 13, process 1300 may include directing, using a substrate having a light directing mechanism, the infrared light reflected from the eye of the user towards an eye tracking camera within the lens module (block 1320). For example, the eye tracking device may direct, using a substrate having a light directing mechanism, the infrared light reflected from the eye of the user towards an eye tracking camera within the lens module, as described above.

As further shown in FIG. 13, process 1300 may include performing, using the eye tracking camera, eye tracking on the eye of the user (block 1330). For example, the eye tracking device may perform, using the eye tracking camera, eye tracking on the eye of the user, as described above.

Process 1300 may include additional implementations, such as any single implementation or any combination of implementations described below and/or in connection with one or more other processes described elsewhere herein.

In a first implementation, the substrate is transparent or semi-transparent to infrared light and visible light, and the substrate is one of a glass substrate or a plastic substrate.

In a second implementation, alone or in combination with the first implementation, the light directing mechanism is a mirror, a film, a facet, a facet patch, a trough, or one or more grooves.

In a third implementation, alone or in combination with one or more of the first and second implementations, process 1300 includes producing, using the eye tracking camera, a first image of the eye of the user based at least in part on a detection of the infrared light at a first angle, and producing, using the eye tracking camera, a second image of the eye of the user based at least in part on the detection of the infrared light at a second angle, wherein the first image and the second image are along an axis, wherein a center between the first image and the second image corresponds to a gaze angle of the eye of the user along the axis.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An eye tracking device, comprising:
a lens module that includes one or more lens elements;
an infrared lighting device, outside of the lens module, configured to produce an infrared light capable of illuminating an eye of a user for eye tracking;
an eye tracking camera within the lens module; and
a substrate having a light directing mechanism configured to direct the infrared light reflected from the eye of the user towards the eye tracking camera,
the eye tracking camera being configured to:
produce a first image of at least a portion of the eye of the user based at least in part on a detection of the infrared light at a first angle; and
produce a second image of at least a portion of the eye of the user based at least in part on the detection of the infrared light at a second angle.

2. The eye tracking device of claim 1, wherein the substrate is transparent or semi-transparent to infrared light and visible light, and wherein the substrate is one of a glass substrate or a plastic substrate.

3. The eye tracking device of claim 1, wherein the light directing mechanism configured to direct the light is: a mirror coupled to the substrate, a film coupled to the substrate, or an angled slit that is at least partially extended into the substrate.

4. The eye tracking device of claim 3, wherein the film coupled to the substrate is a diffractive film or a holographic film.

5. The eye tracking device of claim 1, wherein the light directing mechanism configured to direct the light is a facet associated with the substrate, a facet patch associated with the substrate, a trough extended into the substrate, or one or more grooves extended into the substrate.

6. The eye tracking device of claim 5, wherein the one or more grooves extended into the substrate corresponds to a series of parallel grooves along an axis.

7. The eye tracking device of claim 5, wherein the facet patch associated with the substrate includes a first facet patch corresponding to a first axis and a second facet patch corresponding to a second axis.

8. The eye tracking device of claim 1, wherein the first image and the second image are along an axis.

9. The eye tracking device of claim 8, wherein a center between the first image and the second image is related to a gaze angle of the eye of the user along the axis.

10. The eye tracking device of claim 8, wherein the axis is a horizontal axis.

11. The eye tracking device of claim 8, wherein the axis is a vertical axis.

12. The eye tracking device of claim 1, wherein:
the eye tracking camera is a first eye tracking camera and the light directing mechanism is a first light directing mechanism, and
further comprising a second eye tracking camera and a second light directing mechanism, wherein the first light directing mechanism is perpendicular to the second light directing mechanism.

13. The eye tracking device of claim 12, wherein the first eye tracking camera and the first light directing mechanism are configured to perform eye tracking along a first axis, and the second eye tracking camera and the second light directing mechanism are configured to perform eye tracking along a second axis.

14. The eye tracking device of claim 1, wherein the lens module that includes the one or more lens elements is a pancake lens module.

15. The eye tracking device of claim 1, wherein the eye tracking device is included in a head mounted display.

16. An eye tracking device, comprising:
a lens module that includes one or more lens elements;
an infrared lighting device, outside of the lens module, configured to produce an infrared light to illuminate an eye of a user for eye tracking;
an eye tracking camera within the lens module; and
a light directing mechanism, positioned on a surface of one of the one or more lens elements, configured to direct the infrared light reflected from the eye of the user towards the eye tracking camera,
the eye tracking camera being configured to:
produce a first image of at least a portion of the eye of the user based at least in part on a first angle; and
produce a second image of at least a portion of the eye of the user based at least in part on a second angle, wherein the first image and the second image are along an axis.

17. The eye tracking device of claim 16, wherein the light directing mechanism configured to direct the light is: a mirror, a film, a facet, a facet patch, a trough, or one or more grooves.

18. The eye tracking device of claim 17, wherein the one or more grooves comprises a series of parallel grooves along the axis or a different axis.

19. The eye tracking device of claim 17, wherein the facet patch includes a first facet patch corresponding to a first axis and a second facet patch corresponding to a second axis, wherein the first axis corresponds to a first gaze angle of the eye of the user along the first axis, wherein the second axis corresponds to a second gaze angle of the eye of the user along the second axis, and wherein the axis is the first axis or the second axis.

20. The eye tracking device of claim 16, wherein the axis is a horizontal axis or a vertical axis.

21. The eye tracking device of claim 16, wherein:
the eye tracking camera is a first eye tracking camera and the light directing mechanism is a first light directing mechanism, and
further comprising a second eye tracking camera and a second light directing mechanism, wherein the first light directing mechanism is perpendicular to the second light directing mechanism.

22. The eye tracking device of claim 21, wherein the first eye tracking camera and the first light directing mechanism are configured to perform eye tracking along a first axis, and the second eye tracking camera and the second light directing mechanism are configured to perform eye tracking along a second axis.

23. The eye tracking device of claim 16, wherein a center between the first image and the second image is related to a gaze angle of the eye of the user along the axis.

24. A method, comprising:
producing, using an infrared lighting device outside of a lens module, infrared light to illuminate an eye of a user for eye tracking;
directing, using a substrate having a light directing mechanism, the infrared light reflected from the eye of the user towards an eye tracking camera within the lens module;
producing, using the eye tracking camera, a first image of the eye of the user based at least in part on a detection of the infrared light at a first angle; and
producing, using the eye tracking camera, a second image of the eye of the user based at least in part on the detection of the infrared light at a second angle.

25. The method of claim 24, wherein the substrate is transparent or semi-transparent to infrared light and visible light, and wherein the substrate is one of a glass substrate or a plastic substrate.

26. The method of claim 24, wherein the light directing mechanism is: a mirror, a film, a facet, a facet patch, a trough, or one or more grooves.

27. The method of claim 24, wherein the first image and the second image are along an axis, and
wherein a center between the first image and the second image corresponds to a gaze angle of the eye of the user along the axis.

28. An apparatus, comprising:
means for producing, using an infrared lighting device outside of a lens module, an infrared light to illuminate an eye of a user for eye tracking;
means for directing, using a substrate having a light directing mechanism, the infrared light reflected from the eye of the user towards an eye tracking camera within the lens module;
means for producing, using the eye tracking camera, a first image of the eye of the user based at least in part on a detection of the infrared light at a first angle; and
means for producing, using the eye tracking camera, a second image of the eye of the user based at least in part on the detection of the infrared light at a second angle.

29. The apparatus of claim 28, wherein the light directing mechanism is a mirror, a film, a facet, a facet patch, a trough, or one or more grooves.

30. The apparatus of claim 28, wherein the first image and the second image are along an axis, and
wherein a center between the first image and the second image corresponds to a gaze angle of the eye of the user along the axis.

\* \* \* \* \*